(12) United States Patent
Hamamoto et al.

(10) Patent No.: US 6,866,966 B2
(45) Date of Patent: Mar. 15, 2005

(54) NON-AQUEOUS SECONDARY BATTERY HAVING ENHANCED DISCHARGE CAPACITY RETENTION

(75) Inventors: Toshikazu Hamamoto, Yamaguchi (JP); Koji Abe, Yamaguchi (JP); Tsutomu Takai, Yamaguchi (JP); Yasuo Matsumori, Yamaguchi (JP); Akira Ueki, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 344 days.

(21) Appl. No.: 10/021,130

(22) Filed: Oct. 22, 2001

(65) Prior Publication Data

US 2002/0122988 A1 Sep. 5, 2002

Related U.S. Application Data

(63) Continuation-in-part of application No. 09/631,518, filed on Aug. 3, 2000.

(30) Foreign Application Priority Data

| Aug. 3, 1999 | (JP) | 11-219708 |
| Oct. 20, 2000 | (JP) | 2000-321146 |
| Nov. 2, 2000 | (JP) | 2000-335946 |
| Nov. 29, 2000 | (JP) | 2000-363656 |

(51) Int. Cl.$^7$ ............................................. H01M 10/08
(52) U.S. Cl. ........................ 429/340; 429/327; 429/336
(58) Field of Search ............................... 429/327, 336, 429/340

(56) References Cited

U.S. PATENT DOCUMENTS

| 4,888,255 A | * | 12/1989 | Yoshimitsu et al. ......... 429/101 |
| 5,340,670 A | * | 8/1994 | Takami et al. ............... 429/331 |
| 5,998,670 A | * | 12/1999 | Tang et al. .................... 568/26 |

FOREIGN PATENT DOCUMENTS

| EP | 1199766 | * | 4/2002 | .......... H01M/10/40 |
| EP | 1304758 | * | 4/2003 | .......... H01M/10/40 |
| JP | 3444243 | * | 2/2001 | .......... H01M/10/40 |

\* cited by examiner

*Primary Examiner*—Mark Ruthkosky
(74) *Attorney, Agent, or Firm*—Reed Smith LLP

(57) ABSTRACT

A discharge capacity retention of a non-aqueous secondary battery is enhanced by incorporating into its non-aqueous electrolytic solution a small amount of a substituted diphenyldisulfide derivative in which each of the diphenyl groups has a substituent such as alkoxy, alkenyloxy, alkynyloxy, cycloalkyloxy, aryloxy, acyloxy, alkanesulfonyloxy, arylsulfonyloxy, alkoxycarbonyloxy, aryloxycarbonyloxy, halogen, $CF_3$, $CCl_3$, or $CBr_3$. Preferably, a small amount of methyl 2-propylcarbonate, 2-propynyl methanesulfonate, 1,3-propanesultone, divinylsulfone, 1,4-butanediol dimethanesulfonate or cyclohexylbenzene is further incorporated.

32 Claims, No Drawings

NON-AQUEOUS SECONDARY BATTERY HAVING ENHANCED DISCHARGE CAPACITY RETENTION

CROSS-REFERENCES TO RELATED APPLICATIONS

This is a continuation-in-part application of U.S. patent application Ser. No. 09/631,518, filed Aug. 3, 2000, which claims priority of Japanese Application No. 11-219708 filed Aug. 3, 1999, 2000-321146 filed Oct. 20, 2000, 2000-335946 filed Nov. 2, 2000 and 2000-363656 filed Nov. 29, 2000, the complete disclosure of which are hereby incorporated by reference.

FIELD OF THE INVENTION

The present invention relates to a non-aqueous secondary battery having improved discharge capacity retention, and a non-aqueous electrolytic solution which is advantageously employable for the non-aqueous secondary battery.

BACKGROUND OF THE INVENTION

At present, a non-aqueous secondary battery such as a lithium ion secondary battery is generally employed as an electric source for driving small electronic devices. The non-aqueous secondary battery comprises a positive electrode, a non-aqueous electrolytic solution, and a negative electrode. The non-aqueous lithium ion secondary battery preferably comprises a positive electrode of lithium complex oxide such as $LiCoO_2$, $LiMn_2O_4$, or $LiNiO_2$, a non-aqueous electrolytic solution such as a solution of electrolyte in a carbonate solvent such as ethylene carbonate (EC), propylene carbonate (PC), dimethyl carbonate (DMC), diethyl carbonate (DEC), or methyl ethyl carbonate (MEC), and a negative electrode of carbonaceous material or lithium metal.

The non-aqueous secondary battery preferably has good battery characteristics such as large electric discharge capacity and high electric discharge retention. However, there are observed certain problems in the known non-aqueous secondary battery. For instance, in the non-aqueous lithium ion secondary battery using a positive electrode of $LiCoO_2$, $LiMn_2O_4$, or $LiNiO_2$, oxidative decomposition of a portion of the non-aqueous electrolytic solution undergoes in the electric charging stage. The decomposition product disturbs electrochemical reaction so that the electric discharge capacity decreases. It is considered that the oxidative decomposition is caused in the non-aqueous solvent of the non-aqueous electrolytic solution on the interface between the positive electrode and the electrolytic solution.

Moreover, in the non-aqueous lithium ion secondary battery particularly using negative electrode of carbonaceous material of high crystallinity such as natural graphite or artificial (or synthetic) graphite, reductive decomposition of the solvent of the non-aqueous electrolytic solution undergoes on the surface of the negative electrode in the charging stage. The reductive decomposition on the negative electrode undergoes after repeated charging-discharging procedures even in the case of using ethylene carbonate (EC) which is a preferably employable solvent of the electrolytic solution.

Japanese Patent Provisional Publication No. 10-247517 describes incorporation of a phenolic oxidation inhibitor, a phosphite oxidation inhibitor, or a sulfide oxidation inhibitor into a non-aqueous electrolytic solution of a secondary battery to keep the battery from abnormal exothermic reaction caused in the case of over-charging or formation of short circuit.

Recently, the non-aqueous secondary battery is sometimes employed under very severe conditions such as that the charge-discharge procedure to reach a work voltage higher than 4.2 V, for instance 4.25 V or 4.3 V, is repeated at a high temperature such as 40° C. or higher for a long period of time.

SUMMARY OF THE INVENTION

It is an object of the present invention to provide a non-aqueous secondary battery showing improved discharge capacity retention.

It is another object of the invention to provide a non-aqueous secondary battery showing improved discharge capacity retention even when it is used for a long period of time under severe conditions such as a high working voltage and a high temperature.

It is a further object of the invention to provide a non-aqueous electrolytic solution which is advantageously employable for preparing a non-aqueous secondary battery showing improved discharge capacity retention, particularly even when it is used for a long period of time under severe conditions such as a high working voltage and a high temperature.

The present invention resides in a non-aqueous secondary battery which comprises a positive electrode, a negative electrode, a separator, and an electrolytic solution which contains a substituted diphenyldisulfide derivative having the following formula (I):

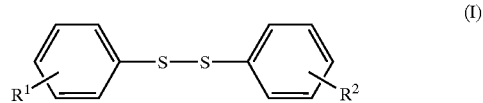

wherein each of $R^1$ and $R^2$ independently represents an alkoxy group having 1 to 6 carbon atoms, an alkenyloxy group having 2 to 6 carbon atoms, an alkynyloxy group having 2 to 6 carbon atoms, a cycloalkyloxy having 3 to 6 carbon atoms, an aryloxy group having 6 to 12 carbon atoms, an aralkyloxy group having 7 to 15 carbon atoms, an acyloxy group having 2 to 7 carbon atoms, an alkanesulfonyloxy group having 1 to 7 carbon atoms, an arylsulfonyloxy group having 6 to 10 carbon atoms, an alkoxycarbonyloxy group having 2 to 7 carbon atoms, an aryloxycarbonyloxy group having 7 to 13 carbon atoms, a halogen atom, $CF_3$, $CCl_3$, or $CBr_3$, in an amount of 0.01 to 5 weight % based on the amount of the electrolytic solution.

The invention further provides a non-aqueous electrolytic solution containing a substituted diphenyldisulfide of the formula (I) in an amount of 0.01 to 5 weight % based on the amount of the electrolytic solution.

The invention further provides a non-aqueous secondary battery which comprises a positive electrode, a negative electrode, a separator, and an electrolytic solution which contains a substituted diphenyldisulfide derivative of the formula (I) in an amount of 0.001 to 5 weight % based on the amount of the electrolytic solution, and an additive compound selected from the group consisting of methyl 2-propylcarbonate, 2-propynyl methanesulfonate, 1,3-propanesultone, divinylsulfone, and 1,4-butanediol dimethanesulfonate, in an amount of 0.01 to 10 weight % based on the amount of the electrolytic solution.

The invention further provides a non-aqueous electrolytic solution containing a substituted diphenyldisulfide derivative of the formula (I) in an amount of 0.001 to 5 weight % based on the amount of the electrolytic solution, and an additive compound selected from the group consisting of methyl 2-propylcarbonate, 2-propynyl methanesulfonate, 1,3-propanesultone, divinylsulfone, and 1,4-butanediol dimethanesulfonate, in an amount of 0.01 to 10 weight % based on the amount of the electrolytic solution.

The invention furthermore provides a non-aqueous secondary battery which comprises a positive electrode, a negative electrode, a separator, and an electrolytic solution which contains a substituted diphenyldisulfide derivative of the formula (I) in an amount of 0.001 to 5 weight % based on the amount of the electrolytic solution, and cyclohexylbenzene in an amount of 0.1 to 5 weight % based on the amount of the electrolytic solution.

The invention furthermore provides a non-aqueous electrolytic solution containing a substituted diphenyldisulfide derivative of the formula (I) in an amount of 0.001 to 5 weight % based on the amount of the electrolytic solution, and cyclohexylbenzene in an amount of 0.1 to 5 weight % based on the amount of the electrolytic solution.

DETAILED DESCRIPTION OF THE INVENTION

The present invention is described below in more detail.

The present invention is characteristic by incorporation of a substituted diphenyldisulfide derivative of the formula (I) into a non-aqueous electrolytic solution containing electrolyte so that the electric discharge capacity retention can be enhanced. Various known materials are employed for constituting the non-aqueous secondary battery of the invention.

Substituted Diphenyldisulfide Derivative

The substituted diphenyldisulfide derivative of the invention has the following formula (I):

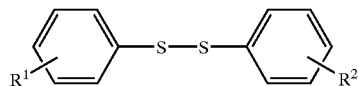

(I)

In the formula (I), each of $R^1$ and $R^2$ independently represents an alkoxy group having 1 to 6 carbon atoms (e.g., methoxy, ethoxy, propoxy, butoxy, pentyloxy, hexyloxy, isopropoxy, isobutoxy, or isopentyloxy), an alkenyloxy group having 2 to 6 carbon atoms (e.g., vinyloxy, 1-propenyloxy, or allyloxy), an alkynyloxy group having 2 to 6 carbon atoms (e.g., ethynyloxy or 2-propinyloxy), a cycloalkyloxy having 3 to 6 carbon atoms (e.g., cyclopropyloxy or cyclohexyloxy), an aryloxy group having 6 to 15 carbon atoms (e.g., phenyloxy or p-tolyl-oxy), an aralkyloxy group having 7 to 15 carbon atoms (e.g., benzyloxy or phenethyloxy), an acyloxy group having 2 to 7 carbon atoms (e.g., acetyloxy, propionyloxy, acryloyloxy, or benzoyloxy), an alkanesulfonyloxy group having 1 to 7 carbon atoms (e.g., methanesulfonyloxy or ethanesulfonyloxy), an arylsulfonyloxy group having 6 to 10 carbon atoms (e.g., benzenesulfonyloxy), an alkoxycarbonyloxy group having 2 to 7 carbon atoms (e.g., methoxycarbonyloxy or ethoxycarbonyloxy), an aryloxycarbonyloxy group (e.g., phenoxycarbonyloxy or benzyloxycarbonyloxy), a halogen atom (e.g., F, Cl, Br, or I), $CF_3$, $CCl_3$, or $CBr_3$.

The substituents $R^1$, $R^2$ can be attached to any possible positions of the phenyl ring. Preferably, each of $R^1$ and $R^2$ is attached to the phenyl ring in the 4-position. Representative examples of the substituted diphenyldisulfide derivatives of the formula (I) include bis(4-methoxyphenyl) disulfide ($R^1=R^2$=methoxy), bis(3-methoxyphenyl) disulfide ($R^1=R^2$=methoxy), bis(2-methoxyphenyl) disulfide ($R^1=R^2$=methoxy), bis(4-ethoxyphenyl)disulfide ($R^1=R^2$=ethoxy), bis(4-isopropoxyphenyl)disulfide ($R^1=R^2$=isopropoxy), bis(4-cyclohexyloxyphenyl)disulfide ($R^1=R^2$=cyclohexyloxy), bis(4-allyloxyphenyl)disulfide ($R^1=R^2$=allyloxy), bis[4-(2-propinyloxy)phenyl]disulfide ($R^1=R^2$=2-propinyloxy), bis(4-phenoxyphenyl)disulfide ($R^1=R^2$=phenoxy), bis(4-acetoxyphenyl)disulfide ($R^1=R^2$=acetoxy), bis(4-benzoyloxyphenyl)disulfide ($R^1=R^2$=benzoyloxy), bis(4-methanesulfonyloxyphenyl)disulfide ($R^1=R^2$=methanesulfonyloxy), bis(4-benzenesulfonyloxyphenyl)disulfide ($R^1=R^2$=benzenesulfonyloxy), bis(4-methoxycarbonyloxyphenyl)disulfide ($R^1=R^2$=methoxycarbonyloxy), bis(4-phenoxycarbonyloxyphenyl)disulfide ($R^1=R^2$=phenoxycarbonyloxy), bis(4-fluorophenyl)disulfide ($R^1=R^2$=F), bis(4-chlorophenyl)disulfide ($R^1=R^2$=Cl), bis(4-bromophenyl)-disulfide ($R^1=R^2$=Br), bis(4-iodophenyl)disulfide ($R^1=R^2$=I), bis(4-trifluoromethylphenyl)disulfide ($R^1=R^2=CF_3$), bis(4-trichloromethylphenyl)disulfide ($R^1=R^2=CCl_3$), and bis (4-tribromomethylphenyl)disulfide ($R^1=R^2=CBr_3$)

The substituted diphenyldisulfide of the formula (I) provides improved characteristics such as enhanced discharge capacity retention to a non-aqueous secondary battery when it is incorporated into its non-aqueous electrolytic solution. The improvement of the invention is more prominent than the case in which diphenyldisulfide (namely, unsubstituted diphenyldisulfide) is incorporated into its non-aqueous electrolytic solution. It is considered that the substituent which contains an atom having an unshared electron pair such as oxygen or halogen supplies electrons from the atom having an unshared electron pair to the positive electrode of the battery when it is charged, whereby smooth oxidative reaction undergoes.

Moreover, the substituted diphenyldisulfide of the aforementioned formula (I) is superior in its solubility in an electrolytic solution to the unsubstituted diphenyldisulfide.

The amount of the substituted diphenyldisulfide derivative of the formula (I) can be in the range of 0.01 to 5 weight % based on the amount of the non-aqueous electrolytic solution. However, it is generally preferred to incorporate the substituted diphenyldisulfide derivative in an amount of 0.01 to 2 weight %, more preferably 0.02 to 1 weight %, based on the amount of the non-aqueous electrolytic solution, so that the discharge capacity retention is further enhanced.

It has been further discovered by the inventors that the discharge capacity retention of a non-aqueous electrolytic solution is further enhanced by incorporating into the solution one or more of specific additive compounds such as methyl 2-propylcarbonate, 2-propynyl methanesulfonate, 1,3-propanesultone, divinylsulfone, and 1,4-butanediol dimethanesulfonate, in combination with a substituted diphenyldisulfide derivative of the formula (I). The enhancement of the discharge capacity retention by the use of the combination of the specific additive compound and a diphenyldisulfide derivative of the formula (I) is particularly effective when a non-aqueous secondary battery is employed under very severe conditions such as that the charge-discharge procedure to reach a work voltage higher than 4.2 V, for instance 4.25 V or 4.3 V, is repeated at a high temperature such as 40° C. or higher (e.g., 40 to 60° C.) for a long period of time. The cut-off voltage can be set to 2.0 V or higher, or 2.5 V or higher. The non-aqueous secondary battery employing the above-mentioned additive combination can be employed with a continuous current discharge under 0.1 to 3 C, in a wide temperature range such as from −40° C. to 100° C.

The addition of the above-mentioned additive compounds into a non-aqueous electrolytic solution per se has been already known. However, it has been not known that the combination of the additive compound with a diphenyldisulfide derivative of the formula (I) is effective to prominently enhance the discharge capacity retention of a non-aqueous electrolytic solution in a non-aqueous secondary battery.

In the combination, the amount of a diphenyldisulfide derivative of the formula (I) can be in the range of 0.001 to 5 weight % based on the amount of the non-aqueous electrolytic solution. However, it is generally preferred to incorporate the diphenyldisulfide derivative in an amount of 0.001 to 1 weight %, more preferably 0.01 to 2 weight %, most preferably 0.02 to 1 weight %, based on the amount of the non-aqueous electrolytic solution, so that the discharge capacity retention is further enhanced. The additive compound is preferably employed in an amount of 0.01 to 10 weight %, more preferably 0.05 to 5 weight %, most preferably 0.1 to 4 weight %, based on the amount of the electrolytic solution.

It has been furthermore discovered by the inventors that the discharge capacity retention of a non-aqueous electrolytic solution is also further enhanced by incorporating into the solution cyclohexylbenzene in combination with a diphenyldisulfide derivative of the formula (I). The incorporation of cyclohexylbenzene in combination with a diphenyldisulfide derivative of the formula (I) into a non-aqueous electrolytic solution is also effective to keep a non-aqueous secondary battery using the electrolytic solution from excessive heat generation caused by over-charge after the repeated charge-discharge procedure for a long period of time, such as 300 cycle charge-discharge procedure.

In the combination, the amount of a diphenyldisulfide derivative of the formula (I) can be in the range of 0.001 to 5 weight % based on the amount of the non-aqueous electrolytic solution. However, it is generally preferred to incorporate the diphenyldisulfide derivative in an amount of 0.001 to 1 weight %, more preferably 0.01 to 0.7 weight %, most preferably 0.03 to 0.5 weight %, based on the amount of the non-aqueous electrolytic solution, so that the discharge capacity retention is further enhanced. The cyclohexylbenzene is preferably employed in an amount of 0.1 to 5 weight %, more preferably 0.5 to 3 weight %, based on the amount of the electrolytic solution.

It is preferred that the additive composition comprises a diphenyldisulfide derivative of the formula (I), the aforementioned additive compound, and cyclohexylbenzene, because such combination is effective to enhance the charge discharge retention characteristics under severe conditions of a non-aqueous secondary battery and further to provide to the battery increased resistance to excessive heat generation which is possibly caused when it is over-charged after a repeated charge-discharge procedure of a long period of time.

There are no specific limitations with respect to the non-aqueous solvent for the preparation of the electrolytic solution. The non-aqueous solvent is generally selected from known non-aqueous solvents for the preparation of non-aqueous electrolytic solutions. A preferred non-aqueous solvent is a mixture of a solvent of a high dielectric constant and a solvent having a low viscosity.

Preferred examples of the solvents of a high dielectric constant include cyclic carbonate solvents such as ethylene carbonate (EC), propylene carbonate (PC), butylene carbonate (BC), and vinylene carbonate (VC). The solvents of a high dielectric constant can be employed singly or in combination.

Examples of the solvents of a low viscosity include linear (or chain) carbonates such as dimethyl carbonate (DMC), methyl ethyl carbonate (MEC), and diethyl carbonate (DEC), methyl propyl carbonate (MPC), methyl isopropyl carbonate (MiPC), methyl butyl carbonate (MBC), dipropyl carbonate (DPC), and dibutyl carbonate (DBC), ethers such as tetrahydrofuran, 2-methyltetrahydrofuran, 1,4-dioxane, 1,2-dimethoxyethane, 1,2-diethoxyethane, and 1,2-dibutoxyethane, lactones such as γ-butyrolactone, nitriles such as acetonitrile, esters such as methyl propionate, and amides such as dimethylformamide. The solvents of a low viscosity are employed singly or in combination.

The solvent of a high dielectric constant and the solvent of a low viscosity can be mixed in an optionally chosen ratio, but are generally mixed in a volume ratio of 1:9 to 4:1 (high dielectric constant solvent:low viscosity solvent), preferably 1:4 to 7:3.

Examples of the electrolytes to be incorporated into the non-aqueous solvent include $LiPF_6$, $LiBF_4$, $LiAsF_6$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(CF_3)_3$, $LiPF_3(C_2F_5)_3$, $LiPF_5(iso-C_3F_7)$, and $LiPF_4(iso-C_3F_7)_2$. The electrolytes can be employed singly or in combination. Generally, the electrolyte can be incorporated into the non-aqueous solvent in such an amount to give an electrolytic solution of 0.1 M to 3 M, preferably 0.5 M to 1.5 M.

The non-aqueous electrolytic solution of the invention is generally prepared by dissolving the electrolyte and the substituted diphenyldisulfide derivative of the formula (I) in a mixture of a high dielectric constant solvent and a low viscosity solvent.

The non-aqueous secondary battery of the invention comprises a positive electrode and a negative electrode in addition to the non-aqueous electrolytic solution containing the substituted diphenyldisulfide derivative of the formula (I).

The positive electrode generally comprises a positive electrode active material and an electro-conductive binder composition.

The positive electrode active material preferably is a complex metal oxide containing one metal element selected from the group consisting of cobalt, manganese, nickel, chromium, iron, and vanadium and a lithium element. Examples of the complex metal oxides include $LiCoO_2$, $LiMn_2O_4$, $LiNiO_2$, and $LiCO_{1-x}Ni_xO_2$ ($0.01<x<1$).

The electro-conductive binder composition can be produced by a mixture of an electro-conductive material such as acetylene black or carbon black, a binder such as poly (tetrafluoroethylene) (PTFE), poly(vinylidene fluoride) (PVDF), styrene-butadiene copolymer (SBR), acrylonitrile-butadiene copolymer (NBR) or carboxymethylcellulose (CMC), and a solvent. For the preparation of a positive electrode, the mixture is coated on a metal plate such as aluminum foil or stainless plate, dried, and pressed for molding. The molded product is then heated in vacuo at a temperature of approx. 50 to 250° C. for approx. 2 hours, to give the desired positive electrode.

The negative electrode comprises a negative electrode active material such as a lithium metal, a lithium alloy, carbonaceous material having a graphite-type crystalline structure which can absorb and release lithium ion, or a complex tin oxide. Examples of the carbonaceous materials include thermally decomposed carbonaceous materials, cokes, graphites (e.g., artificial graphite and natural graphite), fired organic polymer materials, and carbon fibers. Preferred are carbonaceous materials having a graphite-type crystalline structure in which the lattice distance of lattice surface (002), namely, $d_{002}$, is in the range of 3.35 to 3.40 angstrom. The negative electrode active material in the powdery form such as carbonaceous powder is preferably used in combination with a binder such as ethylene propylene diene terpolymer (EPDM), polytetrafluoroethylene (PTFE), poly(vinylidene fluoride) (PVDF), styrene-butadiene copolymer (SBR), acrylonitrile-butadiene copolymer (NBR) or carboxymethyl-cellulose (CMC).

There are no specific limitations with respect to the structure of the non-aqueous secondary battery of the invention. For instance, the non-aqueous secondary battery can be a battery of coin type comprising a positive electrode, a negative electrode, and single or plural separators, or a cylindrical or prismatic battery comprising a positive electrode, a negative electrode, and a separator roll. A polymer battery also can be prepared. The separator can be a known microporous polyolefin film, woven fabric, or non-woven fabric.

The present invention is further described by the following non-limiting examples.

EXAMPLE 1

1) Preparation of Non-Aqueous Electrolytic Solution

In a non-aqueous mixture of ethylene carbonate and dimethyl carbonate [EC:DMC=1:2, volume ratio] was dissolved $LiPF_6$ to give a non-aqueous electrolytic solution of 1 M concentration. To the electrolytic solution was added bis(4-methoxyphenyl)disulfide in an amount of 0.1 wt. % (based on the amount of the electrolytic solution).

2) Preparation of Lithium Secondary Battery and Measurement of its Battery Characteristics $LiCoO_2$ (positive electrode active material, 80 wt. %), acetylene black (electro-conductive material, 10 wt. %), and poly(vinylidene fluoride) (binder, 10 wt. %) were mixed. To the resulting mixture was further added 1-methyl-2-pyrrolidone (solvent). Thus produced positive electrode mixture was coated on aluminum foil, dried, molded under pressure, and heated to give a positive electrode.

Natural graphite (negative electrode active material, 90 wt. %) and poly(vinylidene fluoride) (binder, 10 wt. %) were mixed. To the resulting mixture was further added 1-methyl-2-pyrrolidone (solvent). Thus produced negative electrode mixture was coated on copper foil, dried, molded under pressure, and heated to give a negative electrode.

The positive and negative electrodes, a microporous polypropylene film separator, and the non-aqueous electrolytic solution were combined to give a coin-type battery (diameter: 20 mm, thickness: 3.2 mm).

The coin-type battery was charged at room temperature (20° C.) with a constant electric current (0.8 mA) to reach 4.2 V and then the charging was continued under a constant voltage of 4.2 V. In total, the charging was performed for 5 hours. Subsequently, the battery was discharged to give a constant electric current (0.8 mA). The discharge was continued to give a terminal voltage of 2.7 V. The charge-discharge cycle was repeated 60 times.

The initial discharge capacity was essentially equal to that measured in a battery using an EC/DMC (1/2) solvent mixture (containing no substituted diphenyldisulfide derivative) [see Comparison Example 1].

After the 60 cycle charge-discharge procedure, the discharge capacity was 93.5% of the initial discharge capacity. The low temperature characteristics were satisfactory.

The preparation and evaluation of the battery are summarized in Table 1.

EXAMPLE 2

The procedures for the preparation of non-aqueous electrolytic solution of Example 1 were repeated except for using the bis(4-methoxyphenyl)disulfide in an amount of 0.05 wt. %. Thus prepared non-aqueous electrolytic solution was employed for the manufacture of battery of coin-type in the same manner as in Example 1.

After the 60 cycle charge-discharge procedure, the discharge capacity was 92.1% of the initial discharge capacity The preparation and evaluation of the battery are summarized in Table 1.

EXAMPLE 3

The procedures for the preparation of non-aqueous electrolytic solution of Example 1 were repeated except for using the bis(4-methoxyphenyl)disulfide in an amount of 0.2 wt. %. Thus prepared non-aqueous electrolytic solution was employed for the manufacture of battery of coin-type in the same manner as in Example 1.

After the 60 cycle charge-discharge procedure, the discharge capacity was 92.4% of the initial discharge capacity.

The preparation and evaluation of the battery are summarized in Table 1.

EXAMPLE 4

The procedures for the preparation of non-aqueous electrolytic solution of Example 1 were repeated except for using bis(4-acetoxyphenyl)disulfide in an amount of 0.1 wt. %. Thus prepared non-aqueous electrolytic solution was employed for the manufacture of battery of coin-type in the same manner as in Example 1.

After the 60 cycle charge-discharge procedure, the discharge capacity was 91.2% of the initial discharge capacity.

The preparation and evaluation of the battery are summarized in Table 1.

EXAMPLE 5

The procedures for the preparation of non-aqueous electrolytic solution of Example 1 were repeated except for using bis(4-methanesulfonyloxyphenyl)disulfide in an amount of 0.1 wt. %. Thus prepared non-aqueous electrolytic solution was employed for the manufacture of battery of coin-type in the same manner as in Example 1.

After the 60 cycle charge-discharge procedure, the discharge capacity was 92.9% of the initial discharge capacity.

The preparation and evaluation of the battery are summarized in Table 1.

EXAMPLE 6

The procedures for the preparation of non-aqueous electrolytic solution of Example 1 were repeated except for using bis(4-methoxycarbonyloxyphenyl)disulfide in an amount of 0.1 wt. %. Thus prepared non-aqueous electrolytic solution was employed for the manufacture of battery of coin-type in the same manner as in Example 1.

After the 60 cycle charge-discharge procedure, the discharge capacity was 92.7% of the initial discharge capacity.

The preparation and evaluation of the battery are summarized in Table 1.

EXAMPLE 7

The procedures for the preparation of non-aqueous electrolytic solution of Example 1 were repeated except for using bis(4-fluorophenyl)disulfide in an amount of 0.1 wt. %. Thus prepared non-aqueous electrolytic solution was employed for the manufacture of battery of coin-type in the same manner as in Example 1.

After the 60 cycle charge-discharge procedure, the discharge capacity was 92.8% of the initial discharge capacity.

The preparation and evaluation of the battery are summarized in Table 1.

EXAMPLE 8

The procedures for the preparation of non-aqueous electrolytic solution of Example 1 were repeated except for using bis(4-chlorophenyl)disulfide in an amount of 0.1 wt. %. Thus prepared non-aqueous electrolytic solution was employed for the manufacture of battery of coin-type in the same manner as in Example 1.

After the 60 cycle charge-discharge procedure, the discharge capacity was 91.6% of the initial discharge capacity.

The preparation and evaluation of the battery are summarized in Table 1.

EXAMPLE 9

The procedures for the preparation of non-aqueous electrolytic solution of Example 1 were repeated except for using bis(4-trifluoromethylphenyl)disulfide in an amount of 0.1 wt. %. Thus prepared non-aqueous electrolytic solution was employed for the manufacture of battery of coin-type in the same manner as in Example 1.

After the 60 cycle charge-discharge procedure, the discharge capacity was 92.5% of the initial discharge capacity.

The preparation and evaluation of the battery are summarized in Table 1.

EXAMPLE 10

The procedures for the preparation of non-aqueous electrolytic solution of Example 1 were repeated except for replacing the non-aqueous solvent mixture of ethylene carbonate and dimethyl carbonate with a non-aqueous solvent mixture of ethylene carbonate, propylene carbonate and dimethyl carbonate [EC:PC:DMC=1:1:2, volume ratio]. Thus prepared non-aqueous electrolytic solution was employed for the manufacture of battery of coin-type in the same manner as in Example 1.

The initial discharge capacity was essentially equal to that measured in a battery using an EC/DMC (1/2) solvent mixture (containing no substituted diphenyldisulfide) [see Comparison Example 1]. The low temperature characteristics were satisfactory.

After the 60 cycle charge-discharge procedure, the discharge capacity was 93.0% of the initial discharge capacity.

The preparation and evaluation of the battery are summarized in Table 1.

EXAMPLE 11

The procedure for the preparation of negative electrode was repeated except for replacing the natural graphite with artificial graphite. Thus prepared negative electrode was employed for the manufacture of battery of coin-type in the same manner as in Example 1.

After the 60 cycle charge-discharge procedure, the discharge capacity was 90.3% of the initial discharge capacity.

The preparation and evaluation of the battery are summarized in Table 1.

EXAMPLE 12

The procedure for the preparation of positive electrode was repeated except for replacing the $LiCoO_2$ with $LiMn_2O_4$. Thus prepared positive electrode was employed for the manufacture of battery of coin-type in the same manner as in Example 1.

After the 60 cycle charge-discharge procedure, the discharge capacity was 94.5% of the initial discharge capacity.

The preparation and evaluation of the battery are summarized in Table 1.

Comparison Example 1

The procedures for the preparation of non-aqueous electrolytic solution of Example 1 were repeated except for using no substituted diphenyldisulfide. Thus prepared non-aqueous electrolytic solution was employed for the manufacture of battery of coin-type in the same manner as in Example 1.

After the 60 cycle charge-discharge procedure, the discharge capacity was 83.8% of the initial discharge capacity.

The preparation and evaluation of the battery are summarized in Table 1.

Comparison Example 2

The procedures for the preparation of non-aqueous electrolytic solution of Example 1 were repeated except for replacing the bis(4-methoxyphenyl)disulfide with diphenyldisulfide. Thus prepared non-aqueous electrolytic solution was employed for the manufacture of battery of coin-type in the same manner as in Example 1.

After the 60 cycle charge-discharge procedure, the discharge capacity was 88.7% of the initial discharge capacity.

The preparation and evaluation of the battery are summarized in Table 1.

TABLE 1

| Example | Electrode positive/negative | Disulfide derivative (wt. %) | Electrolytic solution (volume ratio) | Discharge capacity retention (60 cycles) |
|---|---|---|---|---|
| Ex. 1 | $LiCoO_2$/nat. graphite | bis(4-methoxyphenyl)disulfide (0.1) | 1M $LiPF_6$ EC/DMC = 1/2 | 93.5% |
| Ex. 2 | $LiCoO_2$/nat. graphite | bis(4-methoxyphenyl)disulfide (0.05) | 1M $LiPF_6$ EC/DMC = 1/2 | 92.1% |
| Ex. 3 | $LiCoO_2$/nat. graphite | bis(4-methoxyphenyl)disulfide (0.2) | 1M $LiPF_6$ EC/DMC = 1/2 | 92.4% |
| Ex. 4 | $LiCoO_2$/nat. graphite | bis(4-acetoxyphenyl)disulfide (0.1) | 1M $LiPF_6$ EC/DMC = 1/2 | 91.2% |
| Ex. 5 | $LiCoO_2$/nat. graphite | bis(4-methanesulfonyloxyphenyl)disulfide (0.1) | 1M $LiPF_6$ EC/DMC = 1/2 | 92.9% |
| Ex. 6 | $LiCoO_2$/nat. graphite | bis(4-methoxycarbonyloxyphenyl)disulfide (0.1) | 1M $LiPF_6$ EC/DMC = 1/2 | 92.7% |
| Ex. 7 | $LiCoO_2$/nat. graphite | bis(4-fluorophenyl)disulfide (0.1) | 1M $LiPF_6$ EC/DMC = 1/2 | 92.8% |
| Ex. 8 | $LiCoO_2$/nat. graphite | bis(4-chlorophenyl)disulfide (0.1) | 1M $LiPF_6$ EC/DMC = 1/2 | 91.6% |

TABLE 1-continued

| Example | Electrode positive/negative | Disulfide derivative (wt. %) | Electrolytic solution (volume ratio) | Discharge capacity retention (60 cycles) |
|---|---|---|---|---|
| Ex. 9 | $LiCoO_2$/nat. graphite | bis(4-trifluoro-methylphenyl)disulfide (0.1) | 1M $LiPF_6$ EC/DMC = 1/2 | 92.5% |
| Ex. 10 | $LiCoO_2$/nat. graphite | bis(4-methoxyphenyl)disulfide (0.1) | 1M $LiPF_6$ EC/PC/DMC = 1/1/2 | 93.0% |
| Ex. 11 | $LiCoO_2$/art. graphite | bis(4-methoxyphenyl)disulfide (0.1) | 1M $LiPF_6$ EC/DMC = 1/2 | 90.3% |
| Ex. 12 | $LiMn_2O_4$/nat. graphite | bis(4-methoxyphenyl)disulfide (0.1) | 1M $LiPF_6$ EC/DMC = 1/2 | 94.5% |
| Com. 1 | $LiCoO_2$/nat. graphite | none | 1M $LiPF_6$ EC/DMC = 1/2 | 83.8% |
| Com. 2 | $LiCoO_2$/nat. graphite | diphenyl disulfide (0.1) | 1M $LiPF_6$ EC/DMC = 1/2 | 88.7% |

EXAMPLE 13

1) Preparation of Non-Aqueous Electrolytic Solution

In a non-aqueous mixture of ethylene carbonate and methyl ethyl carbonate [EC:MEC=3:7, volume ratio] was dissolved $LiPF_6$ to give a non-aqueous electrolytic solution of 1 M concentration. To the electrolytic solution were added bis(4-methoxyphenyl)disulfide and divinylsulfone in amounts of 0.2 wt. % and 0.5 wt. % (based on the amount of the electrolytic solution), respectively.

2) Preparation of Lithium Secondary Battery and Measurement of its Battery Characteristics $LiCoO_2$ (positive electrode active material, 90 wt. %), acetylene black (electro-conductive material, 5 wt. %), and poly(vinylidene fluoride) (binder, 5 wt. %) were mixed. To the resulting mixture was further added 1-methyl-2-pyrrolidone (solvent). Thus produced positive electrode mixture was coated on aluminum foil, dried, molded under pressure, and heated to give a positive electrode.

Artificial graphite (negative electrode active material, 95 wt. %) and poly(vinylidene fluoride) (binder, 5 wt. %) were mixed. To the resulting mixture was further added 1-methyl-2-pyrrolidone (solvent). Thus produced negative electrode mixture was coated on copper foil, dried, molded under pressure, and heated to give a negative electrode.

The positive and negative electrodes, a microporous polypropylene film separator, and the non-aqueous electrolytic solution were combined to give a cylinder-type battery (diameter: 18 mm, thickness: 65 mm).

The cylinder-type battery was charged at an elevated temperature (45° C.) with a constant electric current (1.45 A, 1C) to reach 4.3 V and then the charging was continued under a constant voltage of 4.3 V. In total, the charging was performed for 3 hours. Subsequently, the battery was discharged to give a constant electric current (1.45 A, 1C). The discharge was continued to give a terminal voltage of 2.75 V. The charge-discharge cycle was repeated 300 times.

The initial discharge capacity was 1.04 times as much as that measured in a battery using an EC/MEC (3/7) solvent mixture (containing no diphenyldisulfide derivative) [see Comparison Example 3].

After the 300 cycle charge-discharge procedure, the discharge capacity was 83.5% of the initial discharge capacity. Thus, high temperature characteristics were satisfactory.

The preparation and evaluation of the battery are summarized in Table 2.

Comparison Example 31

The procedures for the preparation of non-aqueous electrolytic solution of Example 13 were repeated except for using no diphenyldisulfide. Thus prepared non-aqueous electrolytic solution was employed for the manufacture of battery of cylinder-type in the same manner as in Example 13.

The preparation and evaluation of the battery are summarized in Table 2.

Comparison Examples 4 to 7

The procedures for the preparation of non-aqueous electrolytic solution of Example 13 were repeated except for replacing the divinylsulfone with other additive compound (set forth in Table 2) and using no diphenyldisulfide. Thus prepared non-aqueous electrolytic solution was employed for the manufacture of battery of cylinder-type in the same manner as in Example 13.

The preparation and evaluation of the battery are summarized in Table 2.

EXAMPLES 14 to 16

The procedures for the preparation of non-aqueous electrolytic solution of Example 13 were repeated except for replacing the bis(4-methoxyphenyl)disulfide with other substituted diphenyldisulfide (set forth in Table 1) and using no divinylsulfone. Thus prepared non-aqueous electrolytic solution was employed for the manufacture of battery of cylinder-type in the same manner as in Example 13.

The preparation and evaluation of the battery are summarized in Table 2.

TABLE 2

| Example | Disulfide derivative (wt. %) | Other additive compound (wt. %) | Initial discharge capacity | Discharge capacity retention (300 cycles) |
|---|---|---|---|---|
| Ex. 13 | Bis(4-methoxyphenyl)disulfide (0.2) | Divinylsulfone (0.5) | 1.04 | 83.5% |
| Com. 3 | None | Divinylsulfone (0.5) | 1.00 | 76.7% |
| Com. 4 | None | 1,3-Propanesultone (2) | 1.00 | 77.2% |
| Com. 5 | None | 1,3-Butanediol dimethanesulfonate (1) | 1.00 | 75.3% |
| Com. 6 | None | Methyl 2-propynyl carbonate (2) | 1.00 | 74.8% |
| Com. 7 | None | 2-Propynyl methanesulfonate (2) | 1.00 | 75.5% |
| Ex. 14 | Bis(4-methoxyphenyl)disulfide (0.2) | None | 1.02 | 78.6% |
| Ex. 15 | Bis(4-ethoxyphenyl)disulfide (0.2) | None | 1.01 | 78.1% |
| Ex. 16 | Bis(4-chlorophenyl)disulfide (0.2) | None | 1.00 | 77.6% |

Remark: The initial discharge capacity was a relative value based on that measured in Comparison Example 3.

EXAMPLES 17 to 22

The procedures for the preparation of non-aqueous electrolytic solution of Example 13 were repeated except for replacing the bis(4-methoxyphenyl)disulfide with other substituted diphenyldisulfide and/or replacing the divinylsulfone with other additive compound (set forth in Table 3). Further, a non-aqueous mixture of ethylene carbonate and diethyl carbonate [EC:DEC=3:7, volume ratio] was employed. Thus prepared non-aqueous electrolytic solution was employed for the manufacture of battery of cylinder-type in the same manner as in Example 13.

The preparation and evaluation of the battery are summarized in Table 3.

TABLE 3

| Example | Disulfide derivative (wt. %) | Other additive compound (wt. %) | Initial discharge capacity | Discharge capacity retention (300 cycles) |
|---|---|---|---|---|
| Ex. 17 | Bis(4-ethoxy-phenyl)disulfide (0.2) | Divinyl-sulfone (0.5) | 1.04 | 83.1% |
| Ex. 18 | Bis(4-chloro-phenyl)disulfide (0.2) | Divinyl-sulfone (0.5) | 1.03 | 82.8% |
| Ex. 19 | Bis(4-methoxy-phenyl)disulfide (0.2) | 1,3-Propane-sultone (2) | 1.04 | 83.7% |
| Ex. 20 | Bis(4-methoxy-phenyl)disulfide (0.2) | 1,4-Butanediol dimethane-sulfonate (1) | 1.04 | 83.2% |
| Ex. 21 | Bis(4-methoxy-phenyl)disulfide (0.2) | Methyl 2-pro-pynyl carbon-ate (2) | 1.04 | 82.5% |
| Ex. 22 | Bis(4-methoxy-phenyl)disulfide (0.2) | 2-Propynyl methanesul-fonate (2) | 1.04 | 83.3% |

Remark: The initial discharge capacity was a relative value based on that measured in Comparison Example 3.

EXAMPLE 23

The procedures for the preparation of non-aqueous electrolytic solution of Example 13 were repeated except for replacing the artificial graphite with natural graphite and employing a non-aqueous mixture of ethylene carbonate, methyl ethyl carbonate and diethyl carbonate [EC:MEC:DEC=3:5:2, volume ratio]. Thus prepared non-aqueous electrolytic solution was employed for the manufacture of battery of cylinder-type in the same manner as in Example 13.

The initial discharge capacity (relative value) was 1.04, and the discharge capacity after the 300 charge-discharge procedure was 83.7% of the initial discharge capacity.

EXAMPLE 24

The procedures for the preparation of non-aqueous electrolytic solution of Example 13 were repeated except for replacing the $LiCoO_2$ (positive electrode active material) with $LiNi_{0.8}Co_{0.2}O_2$ and employing a non-aqueous mixture of ethylene carbonate, methyl ethyl carbonate and diethyl carbonate [EC:MEC:DEC=3:5:2, volume ratio]. Thus prepared non-aqueous electrolytic solution was employed for the manufacture of battery of cylinder-type in the same manner as in Example 13.

The initial discharge capacity (relative value) was 1.19, and the discharge capacity after the 300 charge-discharge procedure was 81.3% of the initial discharge capacity.

EXAMPLE 25

The procedures for the preparation of non-aqueous electrolytic solution of Example 13 were repeated except for replacing the $LiCoO_2$ (positive electrode active material) with $LiMn_2O_4$, replacing 0.5 wt. % of divinylsulfone with 2 wt. % of 1,3-propanesultone, and employing a non-aqueous mixture of ethylene carbonate, methyl ethyl carbonate and diethyl carbonate [EC:MEC:DEC=3:5:2, volume ratio]. Thus prepared non-aqueous electrolytic solution was employed for the manufacture of battery of cylinder-type in the same manner as in Example 13.

The initial discharge capacity (relative value) was 0.85, and the discharge capacity after the 300 charge-discharge procedure was 82.3% of the initial discharge capacity.

Comparison Example 8

The procedures for the preparation of non-aqueous electrolytic solution of Example 24 were repeated except for employing no diphenyldisulfide derivative. Thus prepared non-aqueous electrolytic solution was employed for the manufacture of battery of cylinder-type in the same manner as in Example 13.

The initial discharge capacity (relative value) was 1.16, and the discharge capacity after the 300 charge-discharge procedure was 75.5% of the initial discharge capacity.

Comparison Example 9

The procedures for the preparation of non-aqueous electrolytic solution of Example 25 were repeated except for employing no diphenyldisulfide derivative. Thus prepared non-aqueous electrolytic solution was employed for the manufacture of battery of cylinder-type in the same manner as in Example 13.

The initial discharge capacity (relative value) was 0.85, and the discharge capacity after the 300 charge-discharge procedure was 76.7% of the initial discharge capacity.

EXAMPLE 26

1) Preparation of Non-Aqueous Electrolytic Solution

In a non-aqueous mixture of ethylene carbonate, propylene carbonate and diethyl carbonate [EC:PC:DEC=30:5:65, volume ratio] was dissolved $LiPF_6$ to give a non-aqueous electrolytic solution of 1 M concentration. To the electrolytic solution were added bis(4-methoxyphenyl)disulfide and cyclohexylbenzene in amounts of 0.2 wt. % and 3 wt. % (based on the amount of the electrolytic solution), respectively.

2) Preparation of Lithium Secondary Battery and Measurement of its Battery Characteristics $LiCoO_2$ (positive electrode active material, 90 wt. %), acetylene black (electro-conductive material, 5 wt. %), and poly(vinylidene fluoride) (binder, 5 wt. %) were mixed. To the resulting mixture was further added 1-methyl-2-pyrrolidone (solvent). Thus produced positive electrode mixture was coated on aluminum foil, dried, molded under pressure, and heated to give a positive electrode.

Artificial graphite (negative electrode active material, 95 wt. %) and poly(vinylidene fluoride) (binder, 5 wt. %) were mixed. To the resulting mixture was further added 1-methyl-2-pyrrolidone (solvent). Thus produced negative electrode mixture was coated on copper foil, dried, molded under pressure, and heated to give a negative electrode.

The positive and negative electrodes, a microporous polypropylene film separator, and the non-aqueous electrolytic solution were combined to give a cylinder-type battery (diameter: 18 mm, thickness: 65 nm). To the battery were attached a pressure relief valve and an internal current cut-out device.

The cylinder-type battery was charged at an elevated temperature (45° C.) with a constant electric current (1.45 A, 1C) to reach 4.25 V and then the charging was continued under a constant voltage of 4.25 V. In total, the charging was performed for 3 hours. Subsequently, the battery was discharged to give a constant electric current (1.45 A, 1C). The discharge was continued to give a terminal voltage of 2.7 V. The charge-discharge cycle was repeated 300 times.

The initial discharge capacity was equal to that measured in a battery using the EC/PC/DEC=30/5/65 solvent mixture (containing no substituted diphenyldisulfide derivative) [see Comparison Example 10].

After the 300 cycle charge-discharge procedure, the discharge capacity was 84.3% of the initial discharge capacity. Thus, high temperature characteristics were satisfactory.

The cylinder-type battery having been subjected to the 300 cycle charge-discharge procedure was then subjected to an over-charge test under the condition that the battery was fully charged and then continuously charged at an ambient temperature (20° C.) with a constant electric current (2.9 A, 2C) until the internal current cut-out device operated.

The over-charging current was cut out at 16 min. The highest temperature on the battery surface measured after the current was cut-out was 79° C.

EXAMPLE 27

The procedures for the preparation of non-aqueous electrolytic solution of Example 26 were repeated except for replacing 0.2 wt. % of the bis(4-methoxyphenyl)disulfide with 0.3 wt. % of bis(4-ethoxyphenyl)disulfide and changing the amount of cyclohexylbenzene from 3 wt. % to 2 wt. %. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 84.1%

Time of over-charging cut-out: 17 min.

Highest temperature after current cut-out: 84° C.

EXAMPLE 28

The procedures for the preparation of non-aqueous electrolytic solution of Example 26 were repeated except for replacing the bis(4-methoxyphenyl)disulfide with bis(4-chlorophenyl)disulfide and changing the amount of cyclohexylbenzene from 3 wt. % to 2 wt. %. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 83.4%

Time of over-charging cut-out: 17 min.

Highest temperature after current cut-out: 84° C.

Comparison Example 10

The procedures for the preparation of non-aqueous electrolytic solution of Example 26 were repeated except for using neither bis(4-methoxyphenyl)disulfide nor cyclohexylbenzene. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 77.2%

Time of over-charging cut-out: 28 min.

Highest temperature after current cut-out: Generation of heat did not cease.

EXAMPLE 29

The procedures for the preparation of non-aqueous electrolytic solution of Example 26 were repeated except for using no cyclohexylbenzene. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 81.8%

Time of over-charging cut-out: 28 min.

Highest temperature after current cut-out: Generation of heat did not cease.

Comparison Example 11

The procedures for the preparation of non-aqueous electrolytic solution of Example 26 were repeated except for using no bis(4-methoxyphenyl)disulfide. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 77.1%

Time of over-charging cut-out: 17 min.

Highest temperature after current cut-out: 85° C.

EXAMPLE 30

The procedures for the preparation of non-aqueous electrolytic solution of Example 26 were repeated except for replacing the artificial graphite with natural graphite. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 84.2%

Time of over-charging cut-out: 16 min.

Highest temperature after current cut-out: 79° C.

EXAMPLE 31

The procedures for the preparation of non-aqueous electrolytic solution of Example 26 were repeated except for replacing $LiCoO_2$ (positive electrode active material) with $LiNi_{0.8}Co_{0.2}O_2$. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 83.3%

Time of over-charging cut-out: 18 min.

Highest temperature after current cut-out: 85° C.

Comparison Example 12

The procedures for the preparation of non-aqueous electrolytic solution of Example 26 were repeated except for replacing LiCoO$_2$ (positive electrode active material) with LiNi$_{0.8}$Co$_{0.2}$O$_2$ and using no bis(4-methoxyphenyl) disulfide. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 75.3%

Time of over-charging cut-out: 18 min.

Highest temperature after current cut-out: 85° C.

EXAMPLE 32

The procedures for the preparation of non-aqueous electrolytic solution of Example 26 were repeated except for replacing LiCoO$_2$ (positive electrode active material) with LiNi$_{0.8}$Co$_{0.2}$O$_2$ and using no cyclohexylbenzene. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 77.6%

Time of over-charging cut-out: 28 min.

Highest temperature after current cut-out: Generation of heat did not cease.

EXAMPLE 33

The procedures for the preparation of non-aqueous electrolytic solution of Example 26 were repeated except for using a non-aqueous mixture of ethylene carbonate, propylene carbonate, vinylene carbonate and diethyl carbonate [EC:PC:VC:DEC=25:8:2:65, volume ratio]. Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 83.7%

Time of over-charging cut-out: 17 min.

Highest temperature after current cut-out: 85° C.

EXAMPLES 34 to 39

The procedures for the preparation of non-aqueous electrolytic solution of Example 34 were repeated except for further adding to the electrolytic solution, 0.5 wt. % of divinylsulfone (Example 34), 1 wt. % of 2-propynyl methanesulfonate (Example 35), 2 wt. % of methyl 2-propynylcarbonate (Example 36), 2 wt. % of 2-butyne-1, 4-diol di-methylcarbonate (Example 37), 3 wt. % of 1,3-propanesultone (Example 38), or 4 wt. % of 1,4-butanediol dimethanesulfonate (Example 39).

Thus prepared non-aqueous electrolytic solution was employed for the manufacture of battery of cylinder-type in the same manner as in Example 26.

The evaluation of the battery showed the following values:

Discharge capacity retention after 300 cycle charge-discharge procedure: 84.5% (Ex. 34), 84.4 (Ex. 35), 84.0 (Ex. 36), 83.9% (Ex. 37), 84.8% (Ex. 38), 84.3 (Ex. 39)

Time of over-charging cut-out: 17 min. (all Examples)

Highest temperature after current cut-out: 85° C. (all Examples).

What is claimed is:

1. A non-aqueous secondary battery which comprises a positive electrode, a negative electrode, a separator, and an solution which contains a substituted diphenyldisulfide derivative having the formula.

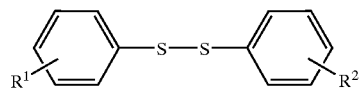

wherein each of R$^1$ and R$^2$ is an alkoxy group having 1–6 carbon atoms, in an amount of 0.01 to 5 weight % based on the amount of the electrolytic solution.

2. The non-aqueous secondary battery of claim 1, wherein the substituted diphenyldisulfide derivative is contained in the non-aqueous electrolytic solution in an amount of 0.01 to 2 weight % based on the amount of the electrolytic solution.

3. The non-aqueous secondary battery of claim 1, wherein the positive electrode comprises lithium complex oxide.

4. The non-aqueous secondary battery of claim 1, wherein the negative electrode comprises natural graphite or artificial graphite.

5. The non-aqueous secondary battery of claim 4, wherein the natural or artificial graphite has a lattice plan of (002) having a plane distance in term of d$_{002}$ in a length of 0.335 to 0.340 nm.

6. A non-aqueous electrolytic solution containing a substituted diphenyldisulfide derivative having the following formula:

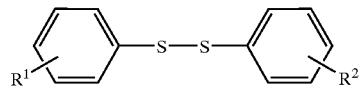

wherein each R$^1$ and R$^2$ is an alkoxy group having 1 to 6 carbon atoms, in an amount of 0.01 to 5 weight % based on the amount of electrolytic solution.

7. The non-aqueous electrolytic solution of claim 6 in which the substituted diphenyldisulfide derivative is bis(4-methoxyphenyl)disulfide.

8. The non-aqueous electrolytic solution of claim 6, wherein the substituted diphenyldisulfide derivative is contained in the non-aqueous electrolytic solution in an amount of 0.01 to 2 weight % based on the amount of the electrolytic solution.

9. The non-aqueous electrolytic solution of clam 6, which contains LiPF$_6$, LiBF$_4$, LiClO$_4$, LiN(SO$_2$CF$_3$)$_2$, LiN(SO$_2$C$_2$F$_5$)$_2$, LiC(SO$_2$CF$_3$)$_3$, LiPF$_4$(CF$_3$)$_2$, LiPF$_3$(CF$_3$)$_3$, LiPF$_3$(C$_2$F$_5$)$_3$, LiPF$_5$(iso-C$_3$F$_7$), or LiPF$_4$(iso-C$_3$F$_7$)$_2$.

10. The non-aqueous electrolytic solution of claim 6, which contains a solvent selected from the group consisting of ethylene carbonate, propylene carbonate, butylene carbonate, vinylene carbonate, dimethyl carbonate, methyl ethyl carbonate, methyl isopropyl carbonate, methyl isobutyl carbonate, diethyl carbonate, diisopropyl carbonate, diisobutyl carbonatetetrahydrofuran, 2-methyltetrahydrofuran, 1,4-dioxane, 1,2-dimethoxyethane, 1,2-diethoxyethane, 1,2-dibutoxyethane, γ-butyrolactone, acetonitrile, methyl propionate, and dimethylformamide.

11. A non-aqueous secondary battery which comprises a positive electrode, a negative electrode, a separator, and an electrolytic solution which contains a substituted diphenyldisulfide derivative having the formula:

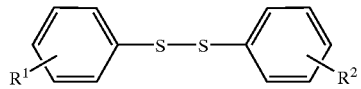

wherein each of $R^1$ and $R^2$ independently represents an alkoxy group having 1 to 6 carbon atoms, an alkenyloxy group having 2 to 6 carbon atoms, an alkynyloxy group having 2 to 6 carbon atoms, a cycloalkyloxy having 3 to 6 carbon atoms, an aryloxy group having 6 to 12 carbon atoms, an aralkyloxy group having 7 to 15 carbon atoms, an acyloxy group having 2 to 7 carbon atoms, an alkanesulfonyloxy group having 1 to 7 carbon atoms, an arylsulfonyloxy group having 6 to 10 carbon atoms, an alkoxycarbonyloxy group having 2 to 7 carbon atoms, a halogen atom, $CF_3$, $CCl_3$, or $CBr_3$, in an amount of 0.001 to 5 weight % based on the amount of the electrolytic solution, and an additive compound selected from the group consisting of methyl 2-propylcarbonate, 2-propynyl methanesulfonate, 1,3-propanesultone, divinylsulfone, and 1,4-butanediol dimethanesulfonate, in an amount of 0.01 to 10 weight % based on the amount of the electrolytic solution.

12. The non-aqueous secondary battery of claim 11, in which each of $R^1$ and $R^2$ is an alkoxy group having 1 to 6 carbon atoms.

13. The non-aqueous secondary battery of claim 11, wherein the negative electrode comprises natural graphite or artificial graphite.

14. The non-aqueous secondary battery of claim 13, wherein the natural or artificial graphite has a Lattice plane of (002) having a plane distance in term of $d_{002}$ in a length of 0.335 to 0.340 nm.

15. A non-aqueous electrolytic solution containing a substituted diphenyldisulfide derivative having the following formula:

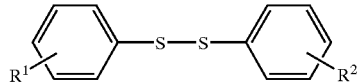

wherein each of $R^1$ and $R^2$ independently represents an alkoxy group having 1 to 6 carbon atoms, an alkenyloxy group having 2 to 6 carbon atoms, an alkynyloxy group having 2 to 6 carbon atoms, a cycloalkyloxy having 3 to 6 carbon atoms, an aryloxy group having 6 to 12 carbon atoms, an aralkyloxy group having 7 to 15 carbon atoms, an acyloxy group having 2 to 7 carbon atoms, an alkanesulfonyloxy group having 1 to 7 carbon atoms, an arylsulfonyloxy group having 6 to 10 carbon atoms, an alkoxycarbonyloxy group having 2 to 7 carbon atoms, a halogen atom, $CF_3$, $CCl_3$, or $CBr_3$, in an amount of 0.001 to 5 weight % based on the amount of the electrolytic solution, and an additive compound selected from the group consisting of methyl 2-propylcarbonate, 2-propynyl methanesulfonate, 1,3-propanesultone, divinylsulfone, and 1,4-butanediol dimethanesulfonate, in an amount of 0.01 to 10 weight % based on the amount of the electrolytic solution.

16. The non-aqueous electrolytic solution of claim 15, in which each of $R^1$ and $R^2$ is an alkoxy group having 1 to 6 carbon atoms.

17. The non-aqueous electrolytic solution of claim 15 in which the substituted diphenyldisulfide derivative is bis(4-methoxyphenyl)disulfide.

18. The non-aqueous electrolytic solution of claim 15, wherein the substituted diphenyldisulfide derivative is contained in the non-aqueous electrolytic solution in an amount of 0.01 to 0.7 weight % based on the amount of the electrolytic solution.

19. The non-aqueous electrolytic solution of claim 15, wherein the additive is contained in the non-aqueous electrolytic solution in an amount of 0.05 to 5 weight % based on the amount of the electrolytic solution.

20. The non-aqueous electrolytic solution of claim 15, which contains $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(CF_3)_3$, $LiPF_3(C_2F_5)_3$, $LiPF_5(iso-C_3F_7)$, or $LiPF_4(iso-C_3F_7)_2$.

21. The non-aqueous electrolytic solution of claim 15, which contains a solvent selected from the group consisting of ethylene carbonate, propylene carbonate, butylene carbonate, vinylene carbonate, dimethyl carbonate, methyl ethyl carbonate, methyl isopropyl carbonate, methyl isobutyl carbonate, diethyl carbonate, diisopropyl carbonate, diisobutyl carbonatetetrahydrofuran, 2-methyltetrahydrofuran, 1,4-dioxane, 1,2-dimethoxyethane, 1,2-diethoxyethane, 1,2-dibutoxyethane, γ-butyrolactone, acetonitrile, methyl propionate, and dimethylformamide.

22. A non-aqueous secondary battery which comprises a positive electrode, a negative electrode, a separator, and an electrolytic solution which contains a substituted diphenyldisulfide derivative having the formula:

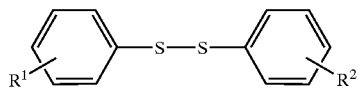

wherein each of $R^1$ and $R^2$ independently represents an alkoxy group having 1 to 6 carbon atoms, an alkenyloxy group having 2 to 6 carbon atoms, an alkynyloxy group having 2 to 6 carbon atoms, a cycloalkyloxy having 3 to 6 carbon atoms, an aryloxy group having 6 to 12 carbon atoms, an aralkyloxy group having 7 to 15 carbon atoms, an acyloxy group having 2 to 7 carbon atoms, an alkanesulfonyloxy group having 1 to 7 carbon atoms, an arylsulfonyloxy group having 6 to 10 carbon atoms, an alkoxycarbonyloxy group having 2 to 7 carbon atoms, a halogen atom, $CF_3$, $CCl_3$, or $CBr_3$, in an amount of 0.001 to 5 weight % based on the amount of the electrolytic solution, and cyclohexylbenzene in an amount of 0.1 to 5 weight % based on the amount of the electrolytic solution.

23. The non-aqueous secondary battery of claim 22, in which each of $R^1$ and $R^2$ is an alkoxy group having 1 to 24 carbon atoms.

24. The non-aqueous secondary batters of claim 22, wherein the negative electrode comprises natural graphite or artificial graphite.

25. The non-aqueous secondary battery of claim 24, wherein the natural or artificial graphite has a Lattice plane of (002) having a plane distance in term of $d_{002}$ in a length of 0.335 to 0.340 nm.

26. A non-aqueous electrolytic solution containing a substituted diphenyldisulfide derivative having the following formula:

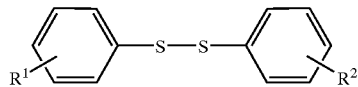

wherein each of $R^1$ and $R^2$ independently represents an alkoxy group having 1 to 6 carbon atoms, an alkenyloxy group having 2 to 6 carbon atoms, an alkynyloxy group having 2 to 6 carbon atoms, a cycloalkyloxy having 3 to 6 carbon atoms, an aryloxy group having 6 to 12 carbon atoms, an aralkyloxy group having 7 to 15 carbon atoms, an acyloxy group having 2 to 7 carbon atoms, an alkanesulfonyloxy group having 1 to 7 carbon atoms, an arylsulfonyloxy group having 6 to 10 carbon atoms, an alkoxycarbonyloxy group having 2 to 7 carbon atoms, a halogen atom, $CF_3$, $CCl_3$, or $CBr_3$, in an amount of 0.001 to 5 weight % based on the amount of the electrolytic solution, and cyclohexylbenzene in an amount of 0.1 to 5 weight % based on the amount of the electrolytic solution.

27. The non-aqueous electrolytic solution of claim 26, in which each of $R^1$ and $R^2$ an alkoxy group having 1 to 6 carbon atoms.

28. The non-aqueous electrolytic solution of claim 26 in which the substituted diphenyldisulfide derivative is bis(4-methoxyphenyl)disulfide.

29. The non-aqueous electrolytic solution of claim 26, wherein the substituted diphenyldisulfide derivative is contained in the non-aqueous electrolytic solution in an amount of 0.01 to 0.7 weight % based on the amount of the electrolytic solution.

30. The non-aqueous electrolytic solution of claim 26, wherein the cyclohexylbenzene is contained in the non-aqueous electrolytic solution in an amount of 0.5 to 3 weight % based on the amount of the electrolytic solution.

31. The non-aqueous electrolytic solution of claim 26, which contains $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(CF_3)_3$, $LiPF_3(C_2F_5)_3$, $LiPF_5(iso-C_3F_7)$, or $LiPF_4(iso-C_3F_7)_2$.

32. The non-aqueous electrolytic solution of claims 26, which contains a solvent selected from the group consisting of ethylene carbonate, propylene carbonate, butylene carbonate, vinylene carbonate, dimethyl carbonate, methyl ethyl carbonate, methyl isopropyl carbonate, methyl isobutyl carbonate, diethyl carbonate, diisopropyl carbonate, diisobutyl carbonatetetrahydrofuran, 2-methyltetrahydrofuran, 1,4-dioxane, 1,2-dimethoxyethane, 1,2-diethoxyethane, 1,2-dibutoxyethane, γ-butyrolactone, acetonitrile, methyl propionate, and dimethylformamide.

* * * * *